April 29, 1924.
C. E. WUENSCH
1,492,502
METHOD OF AND APPARATUS FOR REDUCING POWDERED ORES
Filed March 27, 1920  2 Sheets—Sheet 1
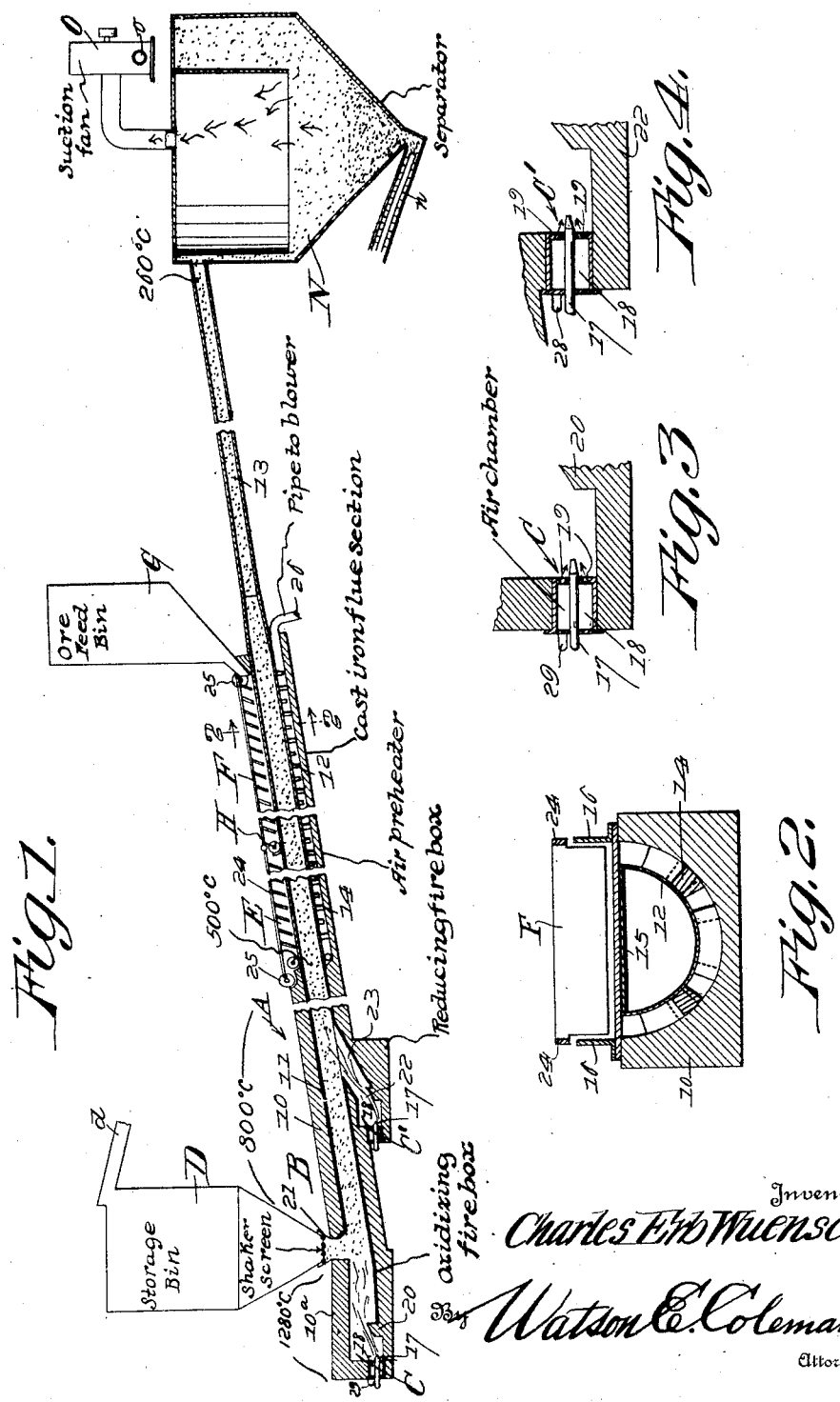

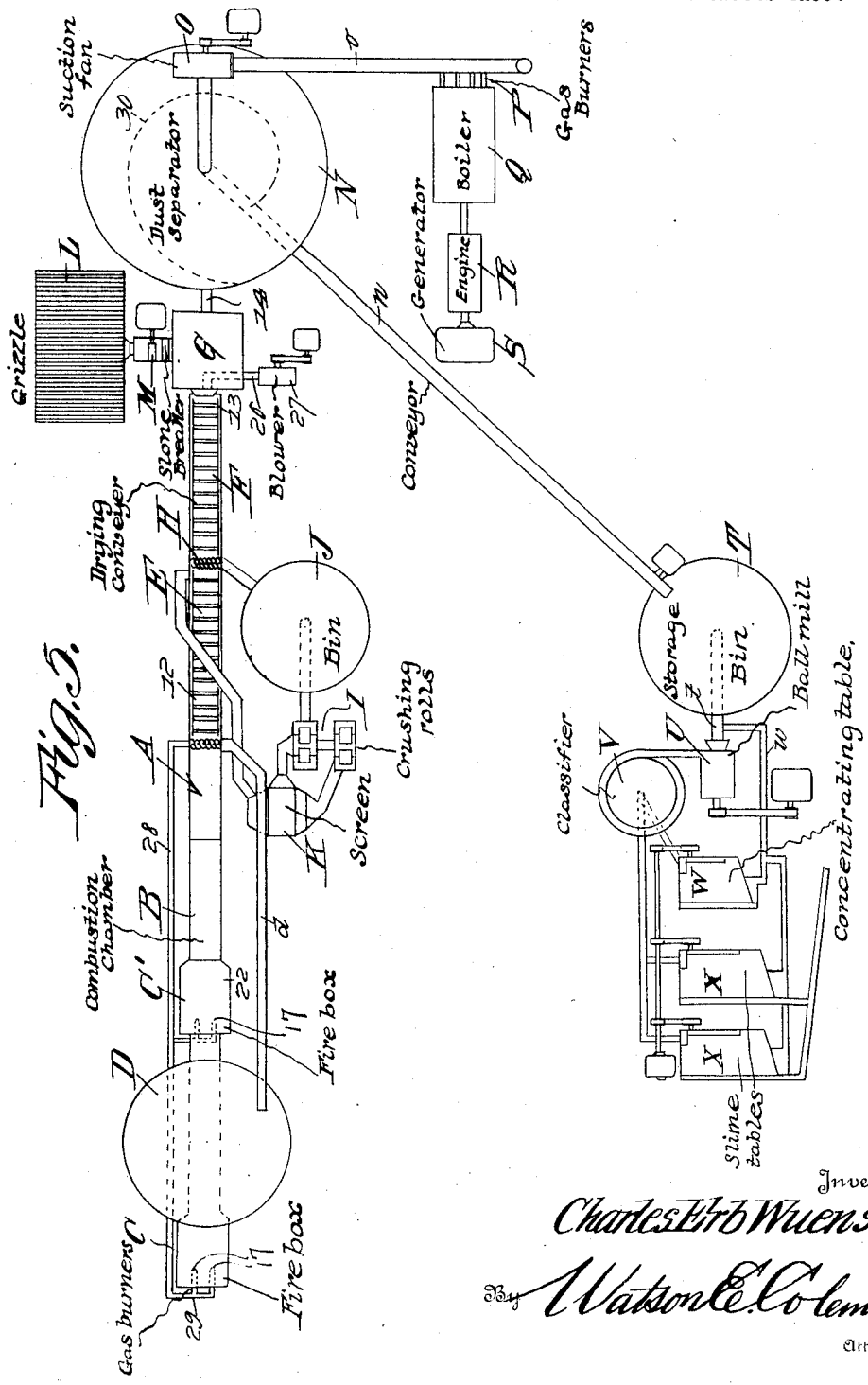

Patented Apr. 29, 1924.

1,492,502

UNITED STATES PATENT OFFICE.

CHARLES ERB WUENSCH, OF GOLDEN, COLORADO.

METHOD OF AND APPARATUS FOR REDUCING POWDERED ORES.

Application filed March 27, 1920. Serial No. 369,267.

*To all whom it may concern:*

Be it known that I, CHARLES ERB WUENSCH, a citizen of the United States, residing at Golden, in the county of Jefferson and State of Colorado, have invented certain new and useful Improvements in Methods of and Apparatus for Reducing Powdered Ores, of which the following is a specification, reference being had to the accompanying drawings.

This invention relates to processes and apparatus for the smelting and reduction of powdered ores, and particularly to the treatment of oxidized ores or mixed oxidized and sulphide ores, and the general object of the invention is to improve upon, simplify and render more effective the apparatus disclosed in my pending application for patent filed in September, 1918, Serial No. 253,581.

One of the important objects of my invention is to provide an apparatus and process particularly designed for treating the large deposits of oxidized and mixed oxidized and sulphide copper ores of the Southwest, and which can be further utilized for the purpose of treating complex lead zinc ores (preferably flotation concentrates) containing small amounts of copper and other metals.

A further object is to provide a furnace so constructed that the ore may be sucked through the furnace, and ore passing through the furnace is first subjected to oxidizing conditions and then subjected to reducing conditions, and in which the temperature of the discharge portion of the furnace is greatly lowered or cooled so that the metallic particles and the gangue particles are discharged in the form of dust, and without forming slag, into a dust receiving chamber, the gases being withdrawn from this chamber, and the dust also taken away for concentration or further treatment.

A further object is to provide a method and apparatus of such character that inflammable gases are evolved which may be used for the purpose of driving the grinding, crushing, elevating and suction blower mechanisms.

Another object is to provide an apparatus of this character wherein the ore in a coarsely crushed form may be dried by passing it over that portion of the tubular furnace wherein the temperature is to be reduced, thus utilizing the coarsely ground ore for the purpose of reducing the temperature and at the same time utilizing this heat for the purpose of preheating the air, and to dry the ore preparatory to fine crushing.

Another object is to provide a furnace in which the cooling portion of the tubular furnace may be utilized not only for the purpose of treating the coarsely ground ore but may be utilized for the purpose of roasting relatively finely ground ore previous to its discharge into the furnace itself for the oxidizing and reducing operations.

Still another object is to provide means for cooling the discharge portion of the furnace by providing a jacket surrounding that portion of the furnace supplying air to this jacket and thus preheating the air and at the same time cooling this portion of the furnace and utilizing this heated air in connection with the burners discharging oil, powdered coal, or producer gas into the inlet end of the furnace.

A further general object is to provide a process and apparatus by which it is possible to treat oxidized ores of copper occurring in limestone gangue which are not amenable to leaching processes using acid as a solvent, and further which is capable of treating mixed oxidized and sulphide ores which are not amenable to ammonia or acid leaching because of the insolubility of the sulphide particles in the solvent, and further whereby a very high-grade concentrate can be produced with about ⅓ the fuel consumption used in ordinary methods of smelting and with the very important advantage that no fluxing is necessary.

Other objects will appear in the course of the following description.

My invention is illustrated in the accompanying drawings, wherein:—

Figure 1 is a longitudinal sectional view of a furnace constructed in accordance with my invention;

Figure 2 is a section on the line 2—2 of Figure 1;

Figures 3 and 4 are enlarged longitudinal sectional views through the two fire boxes;

Figure 5 is a diagrammatic top plan view of the complete plant.

In the accompanying drawings, I have illustrated an embodiment of the powdered ore smelter used in carrying out my process, and in these drawings A designates a flue, which, for the greater portion of its length is upwardly extending, but which, at its entrance end, is relatively horizontal, as at 10ª. This flue for a certain portion of its length is formed of ordinary brick 10, and this brick portion is lined with a refractory lining 11 of chromite. This flue of fire brick is continued by means of a cast iron section 12, also upwardly and forwardly inclined, and terminating in a portion or section 13 which extends into a dust separator, as will be later stated. The brick 11 extends around the under side of the cast iron section 12, as illustrated in Figure 2, but is spaced therefrom to provide an air preheating chamber 14 which has the length of the section 12 and is connected to a blower and has checkerwork therein. Preferably, though not necessarily, the combustion chamber, designated B, which extends from practically the rear end of the furnace to the cast iron extension 12, will be U-shaped in cross section and have a flat top. The cast iron section 12 will also be U-shaped in cross section, and extending across the top of the section 12 will be a cast iron plate 15, to which will be attached angle irons 16 having upwardly extending flanges, these angle irons extending along the margin of the plate 15.

At its rear end the combustion chamber will have the form in cross section illustrated in Figure 1 to form an oxidizing fire box C, as I will hereafter call it, and entering into this fire box will be a plurality of oil or gas burners, illustrated in detail in Figure 3, each of these burners comprising an oil pipe 17 which extends into an air chamber 18, this oil pipe extending out from the air chamber in the form of a nozzle and the air chamber having perforations 19 in its wall concentric to the nozzle, these perforations or air nozzles being so directed as to discharge the air in a cone surrounding the discharging jet of oil (see Figure 4). This is an ordinary form of oil burner, and I do not wish to be limited to this but have merely described it for illustrative purposes. The flames discharged from these burners will strike a baffle wall 20 which will deflect the flames slightly upward and forward. Forward of this oxidizing fire box C formed by the section 10ª is a storage bin D having a hopper-shaped bottom discharging or feeding downward into the top of the combustion chamber B whereby very finely powdered ore may be discharged into the combustion chamber. This storage feed bin D is shown as being provided with a shaker screen feeder 21 at its discharge end, but this shaker screen has been illustrated diagrammatically, as its construction is common and well known. From this point onward the flue or combustion chamber B extends at a slight upward inclination, and beyond the point where the powdered ore enters the combustion chamber a second fire box C' is formed having an upwardly and forwardly discharging outlet passage 23 intersecting the bottom of the combustion chamber B. This fire box is also formed with burners of the same character as those heretofore described and discharging a blast upward and forward into the combustion chamber, and against a baffle 22.

The cast iron flue section 12 is also designed as an air preheater, as a drier and as a roaster. I have illustrated this section in Figure 2 as a drier and roaster, and to this end I have illustrated as mounted upon the flat top of this flue section two conveyors whereby ore may be conveyed along the flat upper surface of the flue section 12 and either dried or roasted. The portion E of the flue section 12 constitutes the roasting portion of the flue, and the portion F the drying section of the flue. I have illustrated a rake conveyor mounted upon each of these sections. Each of the conveyors consists of a longitudinal element 24 having downwardly extending rake blades, the rake being given a circular movement by eccentrics or other suitable means 25 which will cause the rake to shift the ore over the surface of the section 12. The ore to be dried is, of course, crushed ore delivered to the drying section from a bin G, but in order to roast this ore it must be crushed, and, therefore, the ore delivered from the drier section is taken by a conveyor H to a bin J and thence to suitable crushing means, as for instance, crushing rolls I, and then this finely crushed ore is screened by screen K and conveyed to the upper end of the roasting section E and caused to travel over this roasting section to the feed storage bin D, as by means of the elevator d. If the ore is not to be roasted, then the whole section 12 is used as a drier and the dried ore is carried to the storage bin J, then carried by a conveyor to the crushing rolls I, thence to the shaking screen K, and thence by the conveyor d to the bin B.

The ore for the bin G is discharged onto a grizzle L, thence passes into a stone breaker M, and from thence passes into the storage bin G, the stone breaker roughly crushing this ore.

Entering the preheating chamber or space 14 is a pipe 26 which extends to a blower 27 and the air from the end of this preheating pipe 14 is carried by a pipe 28 and branches 29 into the air chambers 18 of the burners C, so that this cast iron flue section 12 performs four functions. It cools the products passing through this section of the flue, it preheats the air which passes to the burners, it dries the coarsely crushed ore, and, if desired, it roasts the finely crushed ore.

From the mouth 13 of the combustion flue or chamber D the particles of ore which have been treated and reduced within the combustion chamber are discharged into a dust separator, designated generally N. This dust separator has a conical, hopper-shaped bottom from which a conveyor $n$ leads. The upper end of this dust separator is connected by a duct to a suction fan O of any suitable or usual construction, and which is connected by a pipe $o$ to a stack, and forms a discharge pipe for the furnace gases. From this discharge pipe leads gas burners P discharging onto the boiler Q, which boiler may be used for operating the steam turbine or other form of engine R, in turn operating an electric generator S from which power may be taken for the purpose of operating the blower 27, the stone breaker M, the gangs of crushing rolls I and the several elevators and conveyors, and operating the ball mill, classifier and concentrators to be described.

Within the dust separator is disposed a spiral baffle wall 30 which extends from the wall of the dust separator N to one side of the mouth 13 of the combustion chamber, and which extends around in a gradually decreasing volute for a certain distance so that the treated ore discharged into the dust separator will be obliged to travel in a circular path before it can possibly discharge into the body of the separator N, and so that this powdered ore and the gases travelling with it will not be sucked out by the suction fan until the ore has time to settle in the form of dust in this dust separator.

The lower end of the dust separator discharges into the conveyor $n$, as previously stated, and this conveyor $n$ carries the ore to a storage bin T, from which it may be carried by a conveyor $t$ to a ball mill U, from which in turn the ore dust which has now been finely powdered is conveyed to the classifier V. From this classifier the relatively coarse material is discharged onto a concentrating table W of any suitable form or character, from which the middlings are carried back by a conveyor or trough $w$ to be again operated on by the ball mill. The fines from the classifier are carried onto the slime tables X where they are concentrated, and the middlings from these tables are carried back for regrinding to the ball mill, while the tailings are carried to the waste dump.

It will be understood, as before remarked, that the concentrating tables W and X and the ball mill, the classifier and the conveyors necessary therefor will all be operated by power taken from the generator S, and it is also to be understood that the illustration of the various conveyors, storage bins, grinding and crushing mills, concentrators, the classifier, blowers, etc., are purely conventional, and that my invention is not limited to the use of any particular forms of these various devices or structures, my invention residing in the general combination of the various elements or structures disclosed in Figure 5, and in the particular construction and arrangement of the oxidizing and reducing furnace, as illustrated in Figures 1 and 2.

Neither do I wish to be limited to the use of burners using oil for the purpose of generating an oxidizing reducing heat within the combustion chamber, as I may use any desired means for feeding finely powdered coal or other fuel and air into the combustion chamber. The operation of the furnace is as follows:—

It will be understood, of course, that the suction fan O exerts a continuous draft through the combustion chamber B so that the finely powdered ore with its envelope of gas is drawn through the combustion chamber from the mouth of the storage feed bin into the dust separator. In that portion of the combustion chamber from the entrance of the storage feed bin to the reducing fire box 22, the ore is oxidized. In that portion of the furnace from the reducing fire box 22 to the cast iron flue section 12, which, it is emphasized, constitutes a cooler, the ore is reduced. In the cast iron sections 12 and 13, the temperature of the ore is greatly reduced by the cooling action of the air in the chamber 14 and through the abstraction of the heat by the drying or roasting of the ore travelling on the top of the section 12. The sections 12 and 13, therefore, constitute a cooler. The temperature in the oxidizing fire box is approximately 1200° C. The temperature in the oxidizing portion of the furnace from the point where the ore is fed into the combustion chamber to the point where the reducing flames impinge on the column of powdered ore is approximately 800° C. This temperature is gradually reduced from the point of intersection of the reducing fire box to the point of connection to the cooling section 12 so that at its junction with the cooling section, the temperature within the combustion chamber is reduced to approximately 500° C. and this temperature is further gradually reduced in the cooler until the ore and gases are at a temperature of about 260° C. when they are discharged into the dust separator.

It is to be understood that the fire boxes C and C' are relatively large so as not to smother the flame but to secure full combustion before the flame is brought into contact with the ore. While the size of the furnace will necessarily vary with different conditions, yet as an instance it may be stated that that portion of the furnace from the end of the oxidizing fire box to where the flue 23 joins the combustion chamber will be about 20' long, that portion of the combustion chamber from the reducing fire box to the section 12 will be about 40' long, and that from the beginning of section 12 to the end thereof will be about 75', while that portion of the furnace which I have illustrated as being between the drier and the dust separating chamber N will be from 50' to 100' long. This portion of the furnace 13 is also to be considered a part of the cooler. I have illustrated the section 12 as being surrounded or partially surrounded by an air jacket in order to preheat the air which passes to the furnace burners, but it is to be understood that other means might be used for cooling this portion of the furnace, and that any means might be used provided this portion of the furnace is cooled by means exterior to the furnace as distinguished from the discharge of water into this portion of the furnace.

In the operation of this mechanism, the dry ore which has been finely crushed to pass through a 10 to 40 mesh screen, varying with different ores, is carried to the storage bin D, from which it is discharged by means of the shaking screen feeder 21 into the combustion chamber, where it is immediately surrounded by the ignited enveloping gases passing from the burners into the oxidizing fire box C. An excess of air enters with the gases in the oxidizing fire box so that between its point of entrance and the entrance of flue 23, the ore is subjected to a temperature of about 800° C. and is oxidized. From the point of entrance of the flue 23 leading from the reducing fire box, the ore is subjected to reducing conditions and thus the metallic oxides in the ore are reduced to a metallic state whereas the gangue metals are unaffected. The metallic particles and the gangue particles, with the gases, are then drawn through the cooling portion of the furnace, that is the portions 12 and 13, and discharged into the dust separator N, the baffle 30 preventing this fine dust from being drawn immediately into the suction fan O, permitting this dust to settle at the bottom of the dust separator, while the gases are drawn out through the suction fan O and duct o, and are then burned, if copper ores are being reduced to metallic copper, for the purpose of generating steam to secure power to operate the various elevators, shakers, grinding mills, etc. The cooler, consisting of the portions 12 and 13 of the furnace, is of great importance, as by this means the solid and gaseous products are sufficiently cooled so that the metallic particles will not be again oxidized to their respective oxides when they come in contact with air in the settling or separator chamber, as would be the case were the metallic particles at a high temperature, forced directly into the settling chamber, and into contact with the air therein.

The metallic particles and gangue particles collected in the dust separator are then carried by the conveyor n to the storage bin T, from which they are carried to the ball mill U, and they are therein wet ground. This regrinding of the metallic and gangue particles which are collected from the dust separator N is a very vital feature of my invention for the reason that I have found by microscopic examination that the metallic copper which is formed in the course of the passage of the ore through the furnace and which is discharged into the dust separator, is extremely porous, so much so that this dust will float on water and that the particles of dust or metallic copper are very fine, though the specific gravity of the copper is relatively heavy, and if it is attempted to concentrate these metallic copper particles, such concentration cannot be secured because the metallic particles will not separate from the gangue particles. By regrinding the metallic and gangue particles secured from the dust separator, however, I break up the air cells occluded in the copper and then these ground particles may be separated from the gangue particles and concentrated by means of the ordinary concentrating tables. It will thus be seen that this regrinding of the particles of copper is particularly necessary to the complete operation of my invention.

By virtue of the conversion of the oxidized minerals, as malachite, for example, with a specific gravity of 3.8 to metallic copper having a specific gravity of 8.8, it is possible to effect a high ratio of concentration and recovery.

The reason for the provision of the oxidizing fire box and of the reducing fire box is in order that between the point where the ore is fed into the furnace and it is being acted on by the flames from the reducing fire box, any sulphide present in the ore may be roasted to the oxide with the formula $SO_2$. From this the material is to be drawn through the zone of the second fire box where the reducing conditions will prevail, and hence both the natural oxidized minerals, as well as the oxidized minerals formed by the sulphide particles by roasting, will be reduced to the metal in the presence of $SO_2$. That this is possible may be understood by considering the following molecular heats of formation:—

|  | Calories. |
|---|---|
| $CO_2$ | 97,200 |
| $SO_2$ | 69,260 |
| $Cu_2O$ | 43,800 |
| $CuO$ | 37,700 |
| $Cu_2S$ | 20,300 |
| $CuS$ | 10,100 |
| $CaS$ | 94,300 |
| $H_2S$ | 4,800 |
| $CS_2$ | 25,400 |
| $FeS$ | 24,000 |
| $Fe_2O_3$ | 195,600 |

As before stated, reducing conditions will prevail in that portion of the furnace from the reducing fire box to the cooler and under these circumstances the carbon of all the substances present has the greatest affinity for the oxygen in the temperature prevailing in the furnace. It will, therefore, rob the material of its oxygen and the result is that the metal in the oxides will be reduced to metallic copper first. Then the iron will be reduced, if any is presented, and if there is still the same reducing agent present, the sulphur dioxide will be reduced. It might be questioned as to whether the metallic particles will not be converted into the original sulphide form, but by reference to the heats of formation given above, it will be seen that the sulphur will combine with the calcium and iron before it will with the copper so that this reaction is a protector for the metallic copper. If the furnace is properly constructed and the process properly carried out, it is possible to control the reducing conditions so that just sufficient carbon will be present to reduce the copper to the metal, and the next step may be the reduction of the iron oxide.

It is to be understood that oxidized copper ores such as copper oxide or copper carbonate do not require to be roasted prior to their admission in powdered form into the furnace, but that if mixed sulphide and oxidized ores are to be treated, the drier, that is the portion of the furnace in which the gases and ore are cooled, is to be built in two sections, one being used as a drier and the other for roasting the copper ore.

Beside the reduction of ores in the manner heretofore described, this furnace is also adapted to "flash roasting" preparatory to magnetic concentration and to the thorough sulphate roasting of flotation concentrates preparatory to leaching processes. Thus, in the present electrolytic zinc process flotation concentrates are roasted at a temperature of about 600° C. to prevent the formation of the insoluble zinc ferrite, but no provision is made to cool the roasted product and get the temperature sufficiently low to favor sulphating. The result is the production of a very small portion of the zinc in the form of water soluble sulphate. With my apparatus, it is possible to suck the flotation concentrates through the furnace with the oxidizing conditions prevailing and the temperature between 800° and 900° C., to roast the sulphides to the oxides or form zinc ferrites. The roasted particles and the products of combustion $SO_2$ and $CO_2$ are then drawn through the cooling portion of the combustion chamber in which the temperature will, at some point along the tube, be correct for instantaneous sulphating. The $SO_2$ under these conditions also breaks up any insoluble zinc ferrites and converts them into water soluble zinc sulphate.

It will be obvious that with the relatively long, tubular furnace which I have described, and with the gradual reduction in temperature from the entrance end of the furnace to the discharge end thereof, that somewhere along this line the temperature will be exactly right for sulphating to occur, and that the production of this temperature is automatic, that it is inherent in the construction of the furnace and in the manner in which it is operated, and in this connection it may be stated that an excess of gas may be allowed to enter the burners so as to secure this sulphating action.

This furnace and the process above described may also be used for the purpose of reducing copper silicates, and then the silica separated from the copper by crushing the dust collected in the dust collecting chamber may be separated and concentrated by the flotation method. The gas drawn from the furnace by the suction fan O will be ordinarily passed through a scrubber before passing to the burners P. I have not illustrated this scrubber, as the treatment of producer gas is well known.

The following points will emphasize in general the advantages of the process and also its special applicability: The oxidized copper ores are usually found in arid regions where water is scarce, and many deposits too small to warrant the expenditure necessary to develop sufficient water for leaching (3 to 6 tons of water per ton of ore being usually required) or the heavy expense of a leaching plant. A plant such as has been described will cost approximately $1,000 per ton daily capacity, that is a 50,000 ton plant will cost about $50,000. Because of the high ratio of concentration and high-grade of the concentrates, together with the low fuel consumption, it is possible by my apparatus to profitably operate isolated deposits which are at present valueless. No fluxes are required, and it makes no difference whether the ore is porphyry, limestone or quartz gangue. Mixed oxidized and sulphide ores can be treated in one step, whereas by leaching methods, as the sulphides are insoluble in solvent, they require a separate treatment for their recovery. The previous metals are in a large part recovered by virtue of their intimate association with the metallic minerals, whereas where leaching processes are used, these precious metals being insoluble, require subsequent treatment for their recovery. The fuel consumption of the furnace is very low, being about $\frac{1}{3}$ or $\frac{1}{4}$ of that required in smelting. The furnace is a continuous one. In other words, there may be a continuous flow of ore from the storage bin B, which may be filled from time to time, however, and a continuous oxidation and reduction of the ore in the furnace and its discharge in the form of dust into the dust separator N, from which the dust may be continuously fed to the grinding mechanism and the concentrators. Thus, no time is lost while the apparatus is closed down for the purpose of cleaning out and putting the furnace in condition for a new batch of ore. Of course, the storage bins for the coarsely crushed ore and the finely crushed ore and the ore to be delivered to the ball mill U and the crushing mill and the concentrators could be filled during day shifts so as to keep the furnace running constantly.

I claim:—

1. An apparatus of the character described including a furnace in the form of a continuous tube, means for discharging finely crushed ore and ignited fuel and air into one end of the furnace, means exterior to the furnace for reducing the temperature of the discharge end thereof, and a closed collecting and separating chamber into which the end of the tubular furnace remote from the point of reception of the ore and fuel opens and into which the products from the cooled portion of the furnace are carried and wherein the solid products are separated from the gaseous products of combustion.

2. An apparatus of the character described including a furnace comprising a continuous tube, means at one end of the furnace for discharging fuel, air and crushed ore into the furnace, a separating and collecting chamber at the opposite end of the furnace into which the discharge end of the furnace discharges, means for causing a positive suction through the length of the furnace from the first named end through the collecting and separating chamber, and means for cooling that portion of the furnace adjacent the separator and collecting chamber.

3. An apparatus of the character described including a tubular furnace, means at one end for discharging fuel and air into the furnace, means adjacent this end of the furnace for discharging finely crushed ore thereinto, a dust collecting and separating chamber at the opposite end of the furnace and into which the tubular furnace discharges, means connected to the separating and collecting chamber for causing a positive suction through said chamber and through the length of the furnace to thereby cause all particles to pass into said collecting and separating chamber, and means for cooling that portion of the furnace adjacent the separating and collecting chamber.

4. An apparatus of the character described including a tubular furnace having a practically heat conserving covering for a portion of its length, means for introducing finely crushed ore, fuel and air into one end of the covered portion of the furnace, a collector and separator into which the other end of the tubular furnace discharges, and means connected to the collector and separator for causing a suction through the entire length of the furnace, that portion of the furnace not surrounded by refractory material and adjacent to the dust collector and separator acting to cool the products of combustion passing through this end of the furnace prior to their discharge into the separator and collector.

5. An apparatus of the character described including a tubular furnace, means at one end for discharging fuel, air and crushed ore into the furnace, a separating and collecting chamber into which said furnace discharges, means connected to the collecting chamber for causing a suction through the length of the furnace and through the collecting chamber, and means for cooling that portion of the furnace adjacent the separator and collector chamber including an air jacket surrounding this portion of the furnace, and means for forcing air through said jacket.

6. An apparatus of the character described including a tubular furnace, means at one end for discharging fuel, air and crushed ore into the furnace, a separating and collecting chamber into which said furnace discharges, means connected to the collecting chamber for causing a suction through the length of the furnace and through the collecting chamber, means for cooling that portion of the furnace adjacent the separator and collecting chamber including an air jacket surrounding this portion of the furnace, means for forcing air through said jacket, and means for utilizing the air preheated by passage through said jacket for supporting combustion within the furnace.

7. An apparatus of the character described including a tubular furnace disposed at an upward inclination, a separator and collecting chamber into which the upper end of the furnace discharges, means at the lower end of the furnace for discharging fuel and air into the furnace, means adjacent the lower end of the furnace for discharging finely crushed ore into the furnace, means for cooling that portion of the furnace adjacent the separating chamber, and means connected to the separating chamber for causing suction through the length of the furnace and separating chamber.

8. An apparatus of the character described including a tubular, upwardly inclined furnace, a collecting and separating chamber into which the upper end of said furnace discharges, a burner at the lower end of the furnace discharging fluid hydrocarbon therein and discharging air for combustion thereinto, means in advance of said burner for discharging crushed ore into the furnace, means adjacent the separator and collecting chamber for reducing the temperature of that portion of the furnace, and means connected to the separator and collecting chamber for causing a suction through the entire length of the furnace and through said collecting and separating chamber.

9. An apparatus of the character described including a furnace comprising a relatively straight tube having means adjacent one end for discharging crushed ore thereinto and having a collecting and separating chamber at the other end into which the furnace discharges, means connected to said collecting and separating chamber for causing a suction through the length of the furnace and chamber, and means for producing oxidizing conditions within the furnace.

10. An apparatus of the character described including a tubular furnace having means adjacent one end for discharging crushed ore thereinto and having a collecting and separating chamber at the other end into which the furnace discharges, means connected to said collecting and separating chamber for causing a suction through the length of the furnace and chamber, means for causing an oxidation of the ore discharged into the furnace for a certain period of its travel through the furnace, means for reducing said ore as it further travels through the furnace, and means for reducing the temperature in that portion of the furnace adjacent the separator.

11. An apparatus of the character described including a tubular furnace connected with and discharging into a separator and collecting chamber, burners at the end of the furnace opposite the separating chamber discharging fluid hydrocarbon and air into the furnace, means for discharging crushed ore into the furnace in advance of said burners, a second set of burners discharging into the furnace in advance of the first set to thereby produce reducing conditions within the furnace, means for reducing the temperature of that portion of the furnace adjacent the separating and collecting chamber, and means connected to the separating and collecting chamber for causing a suction from said chamber and through the length of the furnace.

12. An apparatus of the character described comprising a tubular furnace having a refractory heat conserving covering extending from one end partially along the length of the furnace, a separating and collecting chamber into which the opposite end of the furnace discharges, means connected to the separating and collecting chamber for causing a suction from the separating chamber and through the length of the furnace, a fire box connected to and forming part of that end of the furnace remote from the separating and collecting chamber and having burners discharging air and ignited gas thereinto, a second fire box disposed in advance of the first named fire box and discharging air and ignited gas into the furnace, means for discharging crushed ore into the furnace between the two fire boxes, and means for reducing the temperature of that portion of the furnace adjacent the separating and collecting chamber.

13. An apparatus of the character described including a tubular furnace, means at one end for discharging fuel and air into the furnace, means connected to the other end of the furnace for causing a suction through the length thereof, means at the first named end of the furnace for discharging crushed ore into the furnace, the furnace for a certain portion of its length being protected by a refractory covering and for a certain other portion of its length being unprotected, and means for causing ore to travel over the unprotected portion of the furnace whereby said ore may be heated.

14. An apparatus of the character described including a tubular furnace, means at one end for discharging fuel and air into the furnace, means connected to the other end of the furnace for causing a suction through the length thereof, means at the first named end of the furnace for discharging crushed ore into the furnace, the furnace for a certain portion of its length being protected by a refractory covering and for a certain other portion of its length being unprotected, means for discharging coarsely crushed ore upon a portion of the unprotected portion and causing said ore to travel therealong, means for finely crushing said ore after it has been dried by travelling over the furnace and for discharging said finely crushed ore again upon an unprotected portion of the furnace and causing it to travel therealong to thereby roast the ore, and means for conveying said roasted and finely crushed ore into said furnace.

15. An apparatus of the character described including a tubular furnace, means at one end for discharging fuel and air into the furnace, means connected to the other end of the furnace for causing a suction through the length thereof, means at the first named end of the furnace for discharging crushed ore into the furnace, the furnace for a certain portion of its length being protected by a refractory covering and for a certain other portion of its length being unprotected, means for causing ore to travel over the unprotected portion of the furnace whereby said ore may be heated, and an air jacket surrounding a portion of the unprotected part of the furnace, said air jacket being connected to the air inlets of the burners, and means for forcing air through said jacket and to said burners.

16. An apparatus of the character described including a combustion chamber having means at one end for admitting air and means at this end for discharging crushed ore and carbonaceous material into the combustion chamber, means for highly heating the combustion chamber for a portion of its length, means for reducing the temperature in the combustion chamber for the remainder of its length, means for drawing the particles of crushed ore and carbon through the combustion chamber, said means including a suction fan connected to the combustion chamber, and a separating and collecting chamber into which the combustion chamber discharges and to which the suction fan is connected.

17. A method of reducing ores which consists in causing a current of finely ground ore to flow through a highly heated combustion chamber in the presence of air and carbon to thereby cause the oxidation and subsequent reduction of the ore, carrying the products in a current through a cooler, discharging the products into a collecting chamber and withdrawing the gases from said chamber.

18. A method of reducing ores which consists in causing a current of finely crushed ore to pass through a highly heated combustion chamber to thereby cause the oxidation and subsequent reduction of the ore, cooling the reduced particles without contact with the outside air, causing the cooled particles to settle in the form of dust, and withdrawing the combustion gases from said particles.

19. A method of reducing ores which consists in drawing air and carbonaceous fuel and finely crushed ore through a highly heated chamber to thereby submit the mixture to a temperature sufficiently high that only those minerals which are reduceable by the carbon at a predetermined temperature are acted upon and the other minerals in the ore are unaffected, gradually reducing the temperature of said mixture as it is carried through the chamber, discharging the cooled products into a settling and separating chamber, and withdrawing the gases from said particles.

20. A method of reducing ores which consists in causing a current of finely ground ore, fluid hydrocarbon, ignited fuel and air to flow through a highly heated chamber, that end of the chamber which is remote from the inlet for the fuel, air and ore being cooled for a portion of its length to gradually reduce the temperature of the products without allowing said products to come in contact with the outside air, discharging the products into a settling and separating chamber, and withdrawing the gases from said chamber.

21. A method of reducing ores which consists in causing a constant current of air to pass through a relatively elongated combustion chamber and discharging into one end of said chamber ignited fuel, air and ore to thereby cause the oxidation and subsequent reduction of the ore, exteriorly cooling that portion of the chamber remote from the entrance end thereof to thereby reduce the temperature of the products, and discharging said products into a separating chamber to thereby permit the solid particles to settle in the chamber, and withdrawing the gases therefrom.

22. A method of reducing ores which consists in admitting ignited fuel and air to one end of a relatively elongated combustion chamber, causing a continuous flow of the air and fuel through said chamber from one end to the other, cooling that portion of the chamber remote from its entrance end, continuously discharging finely crushed ore into the entrance end of the chamber, continuously discharging cooled products from the outlet end of the chamber into a settling chamber, permitting the particles to settle into the lower portion of the chamber and continuously withdrawing the gases from the upper portion of the chamber and the solid particles from the lower portion of the settling chamber.

23. A method of reducing ore which consists in mixing finely crushed ore and carbonaceous material, the carbonaceous material having such proportion to the ore as to cause it to reduce the oxides of the metals present in the ore at a predetermined temperature, carrying the mixed ore and carbonaceous material through a chamber heated to a temperature sufficiently high that only those minerals that are reduceable by the carbonaceous material at the predetermined temperature are acted upon and the other minerals in the ore are unaffected, cooling the highly heated particles and the products of combustion while the particles are in a finely divided state without allowing the particles to come in contact with air and then separating the cooled particles from the gaseous products of combustion.

24. A method of reducing ores which consists in causing a current of ignited fluid hydrocarbon and air to pass through an elongated combustion chamber, discharging finely crushed ore into the combustion chamber to thereby cause the carbon present in the fuel to chemically combine with the oxides of metals contained in the ore, exteriorly cooling that portion of the combustion chamber remote from the entrance end to thereby reduce the temperature of the products passing through the combustion chamber, utilizing the heat given off from the combustion chamber at this point as the means for preheating the air entering the chamber, conducting the products into a separating and collecting chamber and allowing the solid particles to descend to the lower portion of said chamber and removing the gases from the upper portion thereof.

25. A method of reducing ores which consists in causing a current of ignited fluid hydrocarbon and air to pass through an elongated combustion chamber, discharging finely crushed ore into the combustion chamber to thereby cause the carbon present in the fuel to commercially combine with the oxides of metals contained in the ore, exteriorly cooling that portion of the combustion chamber remote from the entrance end to thereby reduce the temperature of the products passing through the combustion chamber, utilizing said gases for the purpose of generating power, conducting the products into a separating and collecting chamber and allowing the solid particles to descend to the lower portion of said chamber and removing the gases from the upper portion thereof.

26. A method of reducing ores which consists in causing a current of ignited fluid hydrocarbon and air to pass through an elongated combustion chamber, discharging finely crushed ore into the combustion chamber to thereby cause the carbon present in the fuel to chemically combine with the oxides of metals contained in the ore, exteriorly cooling that portion of the combustion chamber remote from the entrance end to thereby reduce the temperature of the products passing through the combustion chamber, abstracting the heat from the cooling portion of the combustion chamber by passing ore thereover and conducting the ore into the entrance end of the furnace, conducting the products into a separating and collecting chamber and allowing the solid particles to descend to the lower portion of said chamber and removing the gases from the upper portion thereof.

27. A method of reducing ores which consists in causing a current of ignited fluid hydrocarbon and air to pass through an elongated combustion chamber, discharging finely crushed ore into the combustion chamber to thereby cause the carbon present in the fuel to commercially combine with the oxides or metals contained in the ore, exteriorly cooling that portion of the combustion chamber remote from the entrance end to thereby reduce the temperature of the products passing through the combustion chamber, abstracting the heat from the cooling portion of the furnace by passing coarsely crushed ore thereover to dry it, finely grinding said dried ore and returning it to the cooling portion of the furnace and passing it therealong to thereby roast the finely crushed ore, and then discharging said finely crushed ore into the entrance end of the furnace, conducting the products into a separating and collecting chamber and allowing the solid particles to descend to the lower portion of said chamber and removing the gases from the upper portion thereof.

28. A method of reducing ores which consists in causing the discharge of ignited fuel and air into one end of an elongated combustion chamber, causing a current of air and fuel to pass longitudinally through said chamber from one end to the other, discharging finely crushed ore into said chamber in advance of the ignited fuel to thereby oxidize the ore, discharging ignited fuel and air into the chamber in advance of the point of initial entrance of the ore to thereby cause the reduction of the ore, cooling that portion of the combustion chamber remote from its entrance end to thereby gradually reduce the temperature of the products within the furnace, discharging said products into a collecting and separating chamber to permit the solid particles to fall to the bottom of the chamber, and continuously withdrawing the gases from the upper portion of the chamber and the reduced particles from the lower portion of the chamber.

29. A method of reducing ores which consists in causing a current of finely ground ore to flow through a highly heated combustion chamber in the presence of air and carbon to thereby cause the oxidation and reduction of ore, carrying the products in a current through a cooler, discharging the products into a collecting chamber and withdrawing the gases from said chamber, and grinding said solid products taken from the collecting chamber to thereby break up the heretofore porous particles to permit their concentration.

30. A method of reducing ore which consists in drawing a current of ignited hydrocarbon fuel, air and finely crushed ore through a combustion chamber to thereby cause the oxidation and reduction of the ore, cooling one portion of the combustion chamber to thereby cool the reduced particles without contact with the outside air, causing the cooled particles to settle in the form of dust, and withdrawing the combustion gases from said particles, and grinding the solid product to thereby break up the heretofore porous particles to make them amenable to concentration.

31. A method of reducing ores which consists in permitting ignited fuel and air at one end of a relatively elongated combustion chamber, causing a continuous flow of the ore and fuel through said chamber from one end to the other, cooling that portion of the chamber remote from its entrance end, continuously discharging finely crushed ore into the entrance end of the chamber, continuously discharging cooled products from the outlet end of the chamber into a settling chamber, permitting the solid material to settle in the lower portion of the chamber in the form of dust and continuously withdrawing the gases from the upper portion of the chamber, continuously withdrawing the solid particles from the lower portion of the settling chamber, grinding the solid particles to thereby break up the heretofore porous particles to make them amenable to concentration, and then concentrating said material.

In testimony whereof I hereunto affix my signature.

CHARLES ERB WUENSCH.